(12) United States Patent
Dao et al.

(10) Patent No.: US 11,362,995 B2
(45) Date of Patent: Jun. 14, 2022

(54) SYSTEMS AND METHODS FOR PROVIDING PRE-EMPTIVE INTERCEPT WARNINGS FOR ONLINE PRIVACY OR SECURITY

(71) Applicant: JPMORGAN CHASE BANK, N.A., New York, NY (US)

(72) Inventors: Tuan Dao, Richardson, TX (US); Howard Spector, Woolwich, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/103,255

(22) Filed: Nov. 24, 2020

(65) Prior Publication Data

US 2021/0160215 A1    May 27, 2021

Related U.S. Application Data

(60) Provisional application No. 62/941,247, filed on Nov. 27, 2019.

(51) Int. Cl.
*H04L 67/02* (2022.01)
*H04L 9/40* (2022.01)

(52) U.S. Cl.
CPC ...... *H04L 63/0236* (2013.01); *H04L 63/0272* (2013.01); *H04L 63/105* (2013.01); *H04L 63/1483* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 8,505,094 B1 * | 8/2013 | Xuewen | ............ | H04L 63/1416 726/22 |
| 9,043,385 B1 * | 5/2015 | Lepeska | ............ | H04L 67/2847 709/203 |
| 9,124,622 B1 * | 9/2015 | Falkowitz | ............ | H04L 67/02 |
| 9,356,941 B1 * | 5/2016 | Kislyuk | ............ | H04L 63/14 |

(Continued)

OTHER PUBLICATIONS

International Search Report, dated Feb. 19, 2021, from corresponding International Application No. PCT/US2020/062242.

(Continued)

*Primary Examiner* — Scott B Christensen
(74) *Attorney, Agent, or Firm* — Greenberg Traurig LLP

(57) ABSTRACT

Systems and methods for providing pre-emptive intercept warning for online privacy or security are disclosed. In one embodiment, at a privacy security appliance comprising at least one computer processor, a method for may include: (1) establishing a virtual private network (VPN) connection with a computer application executed by a client device; (2) receiving, over the VPN connection, an internet protocol (e.g., HTTP or HTTPS) request for a website host; (3) communicating the internet protocol request to the website host; (4) receiving a response to the internet protocol request from the website host; (5) inspecting the response for privacy or security issues with embedded links in the response; (6) scoring the embedded links based on the inspection; (7) generating a mock webpage based on the response comprising the scoring for the embedded links; and (8) delivering the mock webpage with the scoring to the application over the VPN. The mock webpage may include links to the embedded links.

20 Claims, 8 Drawing Sheets

(56) References Cited

U.S. PATENT DOCUMENTS

| | | | |
|---|---|---|---|
| 2008/0133540 A1* | 6/2008 | Hubbard | H04L 63/1483 |
| 2010/0100960 A1* | 4/2010 | Wu | H04L 63/14 |
| | | | 726/24 |
| 2012/0005745 A1 | 1/2012 | Wei et al. | |
| 2012/0310937 A1* | 12/2012 | Stibel | G06F 16/951 |
| | | | 707/737 |
| 2012/0317642 A1* | 12/2012 | Royal | H04L 63/1433 |
| | | | 726/22 |
| 2014/0259158 A1* | 9/2014 | Brown | H04L 51/08 |
| | | | 726/22 |
| 2014/0317754 A1* | 10/2014 | Niemela | G06F 21/552 |
| | | | 726/26 |
| 2016/0164915 A1* | 6/2016 | Cook | H04L 63/04 |
| | | | 726/1 |
| 2017/0078321 A1* | 3/2017 | Maylor | H04L 51/12 |
| 2017/0093917 A1 | 3/2017 | Chandra et al. | |
| 2018/0004855 A1* | 1/2018 | Bolshinsky | G06F 16/9536 |
| 2018/0084002 A1 | 3/2018 | Shnitzer | |

OTHER PUBLICATIONS

Written Opinion of the International Searching Authority, dated Feb. 19, 2021, from corresponding International Application No. PCT/US2020/062242.

Meyer, Jorg; How to manage, negotiate, and transfer personal information on the Web, Thesis Fachhochschule Hamburg, XX, XX, Mar. 1, 1999.

\* cited by examiner

SYSTEMS AND METHODS FOR PROVIDING PRE-EMPTIVE INTERCEPT WARNINGS FOR ONLINE PRIVACY OR SECURITY

RELATED APPLICATIONS

This application claims priority to, and the benefit of, U.S. Provisional Patent Application Ser. No. 62/941,247, filed Nov. 27, 2019, the disclosure of which is hereby incorporated, by reference, in its entirety.

BACKGROUND OF THE INVENTION

1. Field of the Invention

Embodiments are generally directed to systems and methods for providing pre-emptive intercept warning for online privacy or security.

2. Description of the Related Art

When users go online whether through a browser or using a mobile application, personal data is exposed to the internet and captured for use to track users. Data gatherers, such as service providers, web hosts, or merchants may collect personal data to target advertisements and or resell digital analytics data to others. Some nefarious entities may even steal credentials or financial data for fraudulent purposes.

SUMMARY OF THE INVENTION

Systems and methods for providing pre-emptive intercept warning for online privacy or security are disclosed. In one embodiment, at a privacy security appliance comprising at least one computer processor, a method for providing pre-emptive intercept warning for online privacy or security may include: (1) establishing a virtual private network (VPN) connection with a computer application executed by a client device; (2) receiving, over the VPN connection, an internet protocol (e.g., HTTP or HTTPS) request for a website host; (3) communicating the internet protocol request to the website host; (4) receiving a response to the internet protocol request from the website host; (5) inspecting the response for privacy or security issues with embedded links in the response; (6) scoring the embedded links based on the inspection; (7) generating a mock webpage based on the response comprising the scoring for the embedded links; and (8) delivering the mock webpage with the scoring to the application over the VPN. The mock webpage may include links to the embedded links.

In one embodiment, the privacy security appliance may obfuscate identifying information for the application and the client device before communicating the internet protocol request to the website host.

In one embodiment, the application may include a web browser.

In one embodiment, the method may further include retrieving, from a database, a privacy policy associated with one of the embedded links, wherein the embedded link may be scored based on the privacy policy.

In one embodiment, the method may further include determining that the embedded link may be on a blacklist of websites, wherein the embedded link may be scored based on its presence on the blacklist.

In one embodiment, the method may further include determining that the embedded link may be on a blacklist of websites, wherein the embedded link may be scored based on its presence on the blacklist.

According to another embodiment, at a privacy security appliance comprising at least one computer processor, a method for providing pre-emptive intercept warning for online privacy or security may include: (1) receiving, from a plug-in for an application executed by a client device, a response to an internet protocol request from a website host, the internet protocol request submitted by the application; (2) inspecting the response for privacy or security issues with embedded links in the response; (3) scoring the embedded links based on the inspection; (4) generating a mock webpage based on the response comprising the scoring for the embedded links; and (5) delivering the mock webpage with the scoring. The mock webpage may include links to the embedded links.

In one embodiment, the application may include a web browser.

In one embodiment, the method may further include retrieving, from a database, a privacy policy associated with one of the embedded links, wherein the embedded link may be scored based on the privacy policy.

In one embodiment, the method may further include determining that the embedded link may be on a blacklist of websites, wherein the embedded link may be scored based on its presence on the blacklist.

In one embodiment, the method may further include determining that the embedded link may be on a blacklist of websites, wherein the embedded link may be scored based on its presence on the blacklist.

According to another embodiment, at a privacy security appliance comprising at least one computer processor, a method for providing pre-emptive intercept warning for online privacy or security may include: (1) establishing a virtual private network (VPN) connection with a computer application executed by a client device; (2) receiving, over the VPN connection, an internet protocol request for a website host; (3) communicating the internet protocol request to the website host; (4) receiving a response to the internet protocol request from the website host; (5) inspecting the response for privacy or security issues with embedded links in the response; (6) scoring the embedded links based on the inspection; (7) associating the scores with each embedded link; and (8) delivering the response with the scoring to the application over the VPN as a mock webpage. The mock webpage may include links to the embedded links.

In one embodiment, the embedded scoring may be not presented until activated.

In one embodiment, the embedded scoring may be activated by hovering over the embedded link or selecting the embedded link.

In one embodiment, the method may further include modifying HTML in the response to display the score for each embedded link.

In one embodiment, the privacy security appliance may obfuscate identifying information for the application and the client device before communicating the internet protocol request to the website host.

In one embodiment, the application may include a web browser.

In one embodiment, the method may further include retrieving, from a database, a privacy policy associated with one of the embedded links, wherein the embedded link may be scored based on the privacy policy.

In one embodiment, the method may further include determining that the embedded link may be on a blacklist of websites, wherein the embedded link may be scored based on its presence on the blacklist.

In one embodiment, the method may further include determining that the embedded link may be on a blacklist of websites, wherein the embedded link may be scored based on its presence on the blacklist.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for providing pre-emptive intercept warning for online privacy or security.

Embodiments may provide an intermediary privacy/security appliance that may include, or have access to, a database of websites and application services and their privacy and security practices and track records. A VPN/Proxy service may route all data traffic from the client to the appliance, and the appliance may inspect each host response. The appliance may present warnings to users before the user clicks through or takes any actions the website or application.

In one embodiment, a preview may be presented to the user. In another embodiment, a client-side widget may show warnings for a particular link or site.

Embodiments may present warning to the user in different manners. For example, the website contents are not delivered to the user's browser; instead, a "mock" webpage is generated and presented. Thus, things like cookies, JavaScript, etc., are not stored to the user's computer or executed by user computer's browser.

In other embodiments, website contents may be delivered to the user computer's browser.

Figure 1:
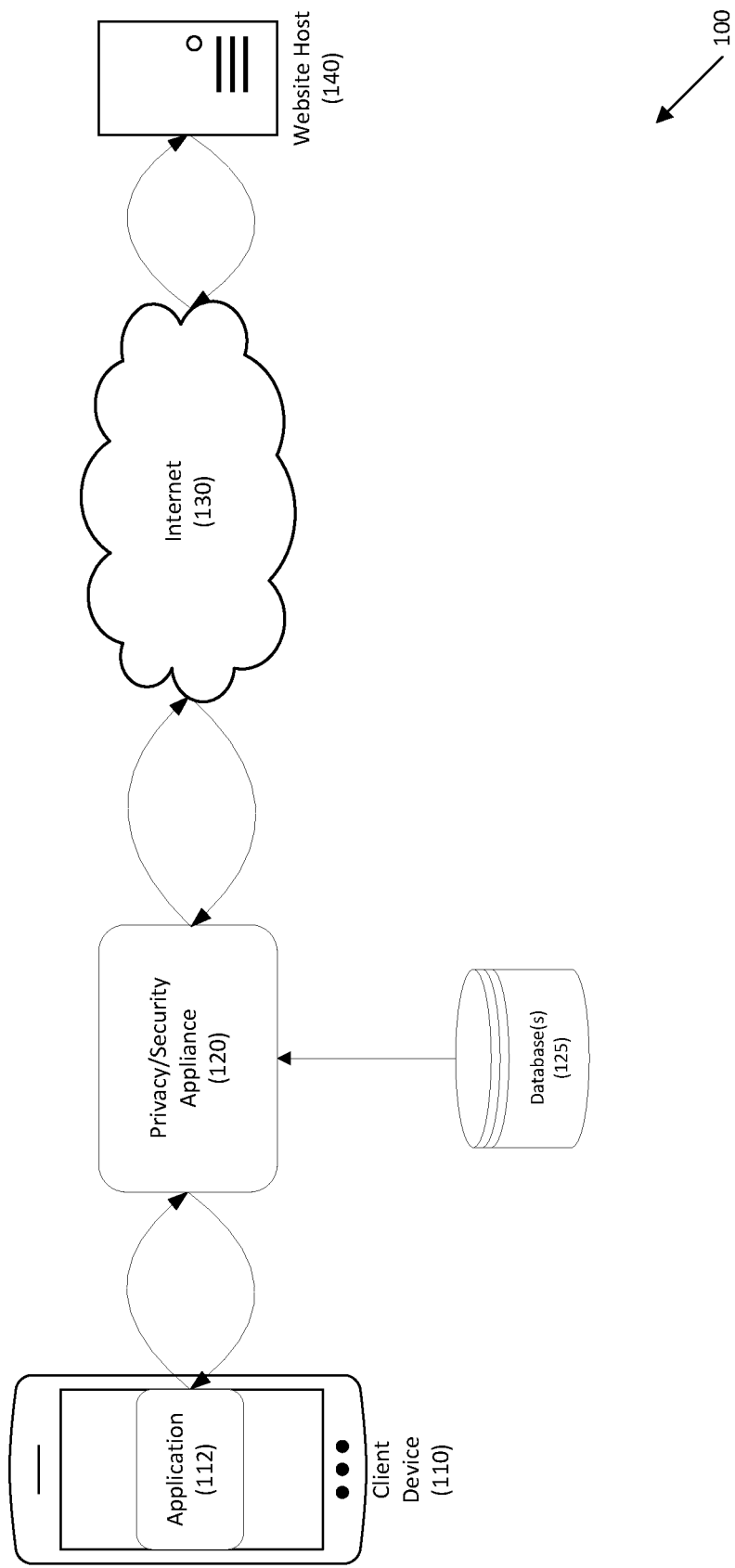
FIG. 1 depicts a system for providing pre-emptive intercept warning for online privacy or security according to one embodiment.

Referring to FIG. 1, a system for providing pre-emptive intercept warning for online privacy or security is disclosed according to an embodiment. System 100 may include client device 110, such as a mobile device, PC, Internet of Things (IoT) appliance, etc., a privacy/security appliance, etc. Client device 110 may execute application 112, which may be a web browser that may browse to websites. Application 112 may also be an application that may attempt to access an online resource.

System 100 may further include privacy/security appliance 120, which may interface with application 112 using a virtual private network, or VPN. In one embodiment, privacy/security appliance 120 may have access to one or more database 125 of website/website host privacy policies and/or scores for those websites/website hosts, whitelists of "safe" websites, and/or blacklists of "unsafe" websites, fraud data, etc.

In one embodiment, instead of a VPN, a plug-in or proxy (not shown) may be installed on client device 110.

Examples of privacy/security appliances and the data that they may access are disclosed in U.S. Patent Application Ser. Nos. 62/856,491, 62/874,240, 16/598,734, 16/890,991, and 16/838,828, the disclosures of which are hereby incorporated, by reference, in their entireties.

Privacy/security appliance 120 may communicate with website host 140 over network 130, which may be the Internet. In one embodiment, website host 140 may intercept Ajax and other communications from client device 110. In one embodiment, website host 140 may receive internet protocol requests and provide responses to privacy/security appliance 120. Examples of internet protocols include HTTP, HTTPS, HTTP/2, QUIC, etc. Privacy/security appliance 120 may then inspect the responses, score the responses based on information available to it, and return the scorings to application 112. In one embodiment, the scorings may be provided with a mock webpage based on the results received from website host 140. In another embodiment, the scorings may be provided so that they may be viewed when the user selects a link or hovers over a link. In still another embodiment, privacy/security appliance 120 may modify the HTML of the response to embed the scorings in the webpage that is rendered by application 112.

Other techniques for presenting the scorings may be used as is necessary and/or desired.

In one embodiment, because application 112 presents scorings as the user is viewing a webpage or a mock webpage, the user may be fully informed of any risks associated with browsing to a link immediately before the user selects a link, allowing the user to either proceed or not proceed with the selection.

Figure 2:
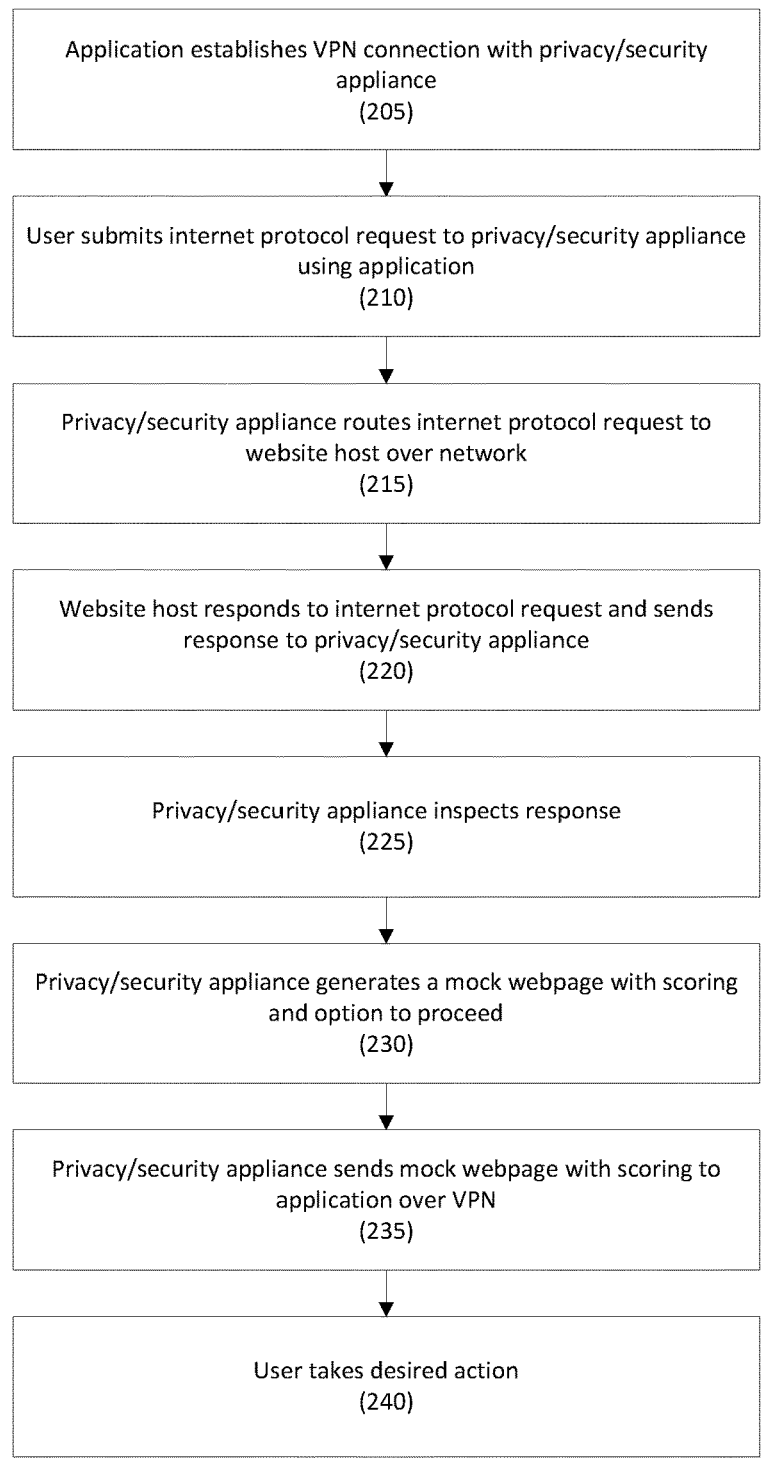
FIG. 2 depicts a method for providing pre-emptive intercept warning for online privacy or security according to one embodiment.

Referring to FIG. 2, a method for providing pre-emptive intercept warning for online privacy or security is disclosed according to an embodiment. In embodiments, the method may be used in conjunction with the system of FIG. 1.

In step 205, an application, such as a browser, may establish a VPN connection with a privacy/security appliance, and, in step 210, may submit an internet protocol request over the VPN to the privacy/security appliance. For example, the internet protocol request may include a direct visit to a website host or a search request.

Examples of internet protocols include HTTP, HTTPS, HTTP/2, QUIC, etc.

In one embodiment, the privacy/security appliance may inspect the internet protocol request and may obfuscate personal information and digital fingerprints to protect the user from being tracked or monitored by the website host. An example of such is disclosed in U.S. Patent Application Ser. Nos. 62/856,491 and 62/874,240, 16/598,734, 16/838, 828, and 16/890,991, the disclosures of which are hereby incorporated, by reference, in their entireties.

In step 215, the privacy/security appliance may route the request to one or more the websites/hosts. In one embodiment, a request to a single website/host may return information from multiple website/hosts.

In step 220, the website host may provide the response to the internet protocol request to the privacy/security appliance.

In step 225, the privacy/security appliance may inspect the response, including packets, that are returned from the website/host. In one embodiment, the privacy/security appliance may retrieve the privacy policy for the website/host, whitelist and/or blacklist information on any links provided in the response, any other risk scoring of the links, etc.

In step 230, the privacy/security appliance may render privacy/security warnings or scores to the user. In one embodiment, the privacy/security warnings may be rendered over a mock webpage for the response(s) from the website(s)/host(s). The mock webpage may represent what the user would see if he user had gone to the website(s) directly.

In embodiments, the website contents are not delivered to the user's browser, as it is a mock webpage. Thus, cookies, JavaScript, etc. are not stored to the user's computer or executed by the user's browser.

In one embodiment, the warnings or scores may be provided using any suitable manner, including colors (e.g., red-amber-green), scores (e.g., 1-10), binary (yes/no), etc. Any suitable manner of conveying the warnings to the user may be used as is necessary and/or desired.

In one embodiment, the scoring may be an interpretation of a website/host privacy and/or security practices and along with track records (e.g., complaints, news articles, lawsuits, etc.).

In step 235, the mock webpage with the warnings or scores may be delivered to the application over the VPN and displayed by the application, and, in step 240, after reviewing the warnings or scores, the user may take the desired action, such as selecting one or more link to the website and may be routed to the host, cancelling the browsing, etc.

For example, the mock webpage may include the original links, may link to the original webpage and then to the original destination, etc.

In embodiments, the links may be provided dynamically based on use or by the user and may be active.

Figure 3:
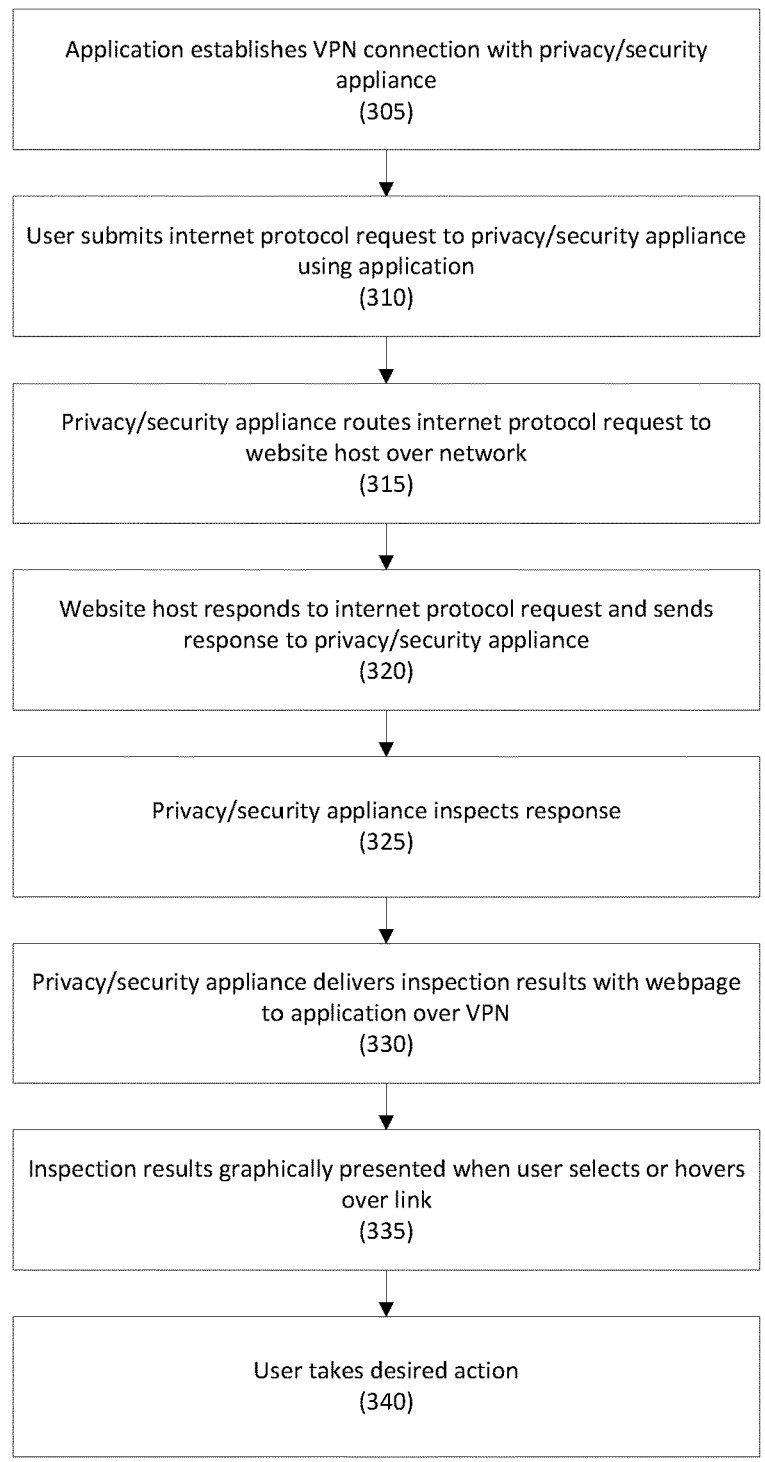
FIG. 3 depicts a method for providing pre-emptive intercept warning for online privacy or security according to another embodiment.

Referring to FIG. 3, a method for providing pre-emptive intercept warning for online privacy or security are disclosed according to another embodiment. In embodiments, the method may be used in conjunction with the system of FIG. 1.

In step 305, an application, such as a browser, may establish a VPN connection with a privacy/security appliance, and, in step 310, may submit an internet protocol request over the VPN to the privacy/security appliance. These steps may be similar to steps 205 and 210, above.

In step 315, the privacy/security appliance may route the request to one or more the websites/hosts, and in step 320, the website host may provide the response to the internet protocol request to the privacy/security appliance. These may be similar to steps 215 and 220, above.

In step 325, the privacy/security appliance may inspect the response, including packets, that are returned from the website/host. This may be similar to step 225, above.

In step 330, the privacy/security appliance may generate privacy/security warnings or scores to the user that are displayed when the user selects or "hovers over" a link in the webpage and may deliver the inspection results with the webpage to the application over the VPN. In one embodiment, the privacy/security appliance may embed hidden warnings in the internet protocol response.

In another embodiment, the privacy/security warning or scores may be embedded in the webpage, may be provided as a separate file, may be provided in a dashboard, etc. The dashboard may further identify website functions that may not be directly visible to the user.

In step 335, the privacy/security warnings or scores may be presented to the user when the user selects a link, hovers over a link, moves a selector toward a link, etc. In one embodiment, the application may require a plug-in to present the user. For example, the web browser displays the web page normally to the user. As the user moves or hovers the mouse over various content or links in the web page, the plug-in will read the hidden warnings and display the warnings to the user.

In step 340, after reviewing the warnings or scores, the user may take the desired action, such as selecting one or more link to the website and may be routed to the host, cancelling the browsing, etc.

Figure 4:
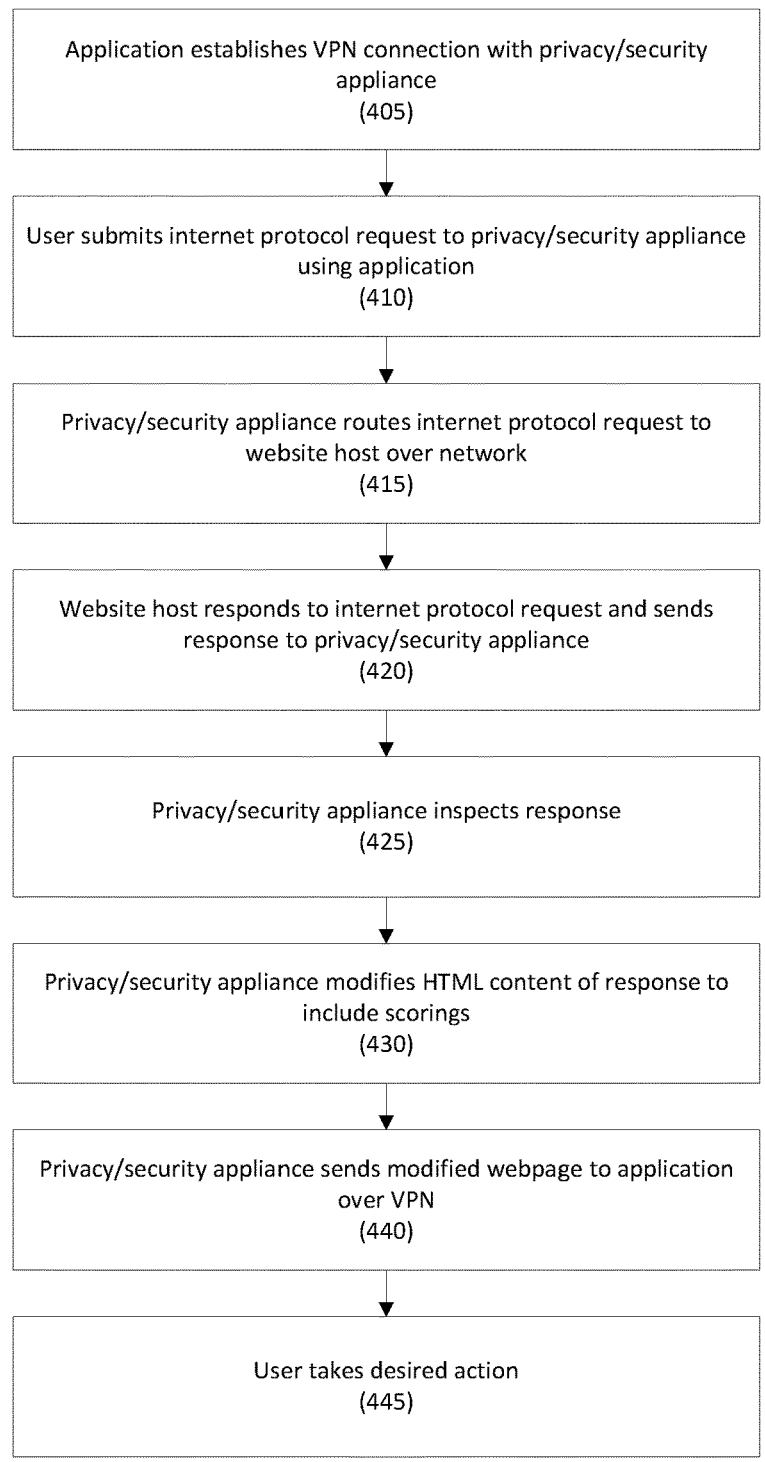
FIG. 4 depicts a method for providing pre-emptive intercept warning for online privacy or security according to another embodiment

Referring to FIG. 4, a method for providing pre-emptive intercept warning for online privacy or security are disclosed according to another embodiment. In embodiments, the method may be used in conjunction with the system of FIG. 1.

In step 405, an application, such as a browser, may establish a VPN connection with a privacy/security appliance, and, in step 410, may submit an internet protocol request over the VPN to the privacy/security appliance. These steps may be similar to steps 405 and 410, above.

In step 415, the privacy/security appliance may route the request to one or more the websites/hosts, and in step 420, the website host may provide the response to the internet protocol request to the privacy/security appliance. These may be similar to steps 215 and 220, above.

In step 425, the privacy/security appliance may inspect the response, including packets, that are returned from the website/host. This may be similar to step 225, above.

In step 430, the privacy/security appliance may modify the HTML to include warnings or scores based on the analysis.

In step 440, the privacy/security appliance may deliver the modified HTML content that includes the warnings or scores to the application using the VPN and the application may display the modified HTML content for the user.

In step 445, after reviewing the warnings or scores, the user may take the desired action, such as selecting one or more link to the website and may be routed to the host, cancelling the browsing, etc.

Figure 5:
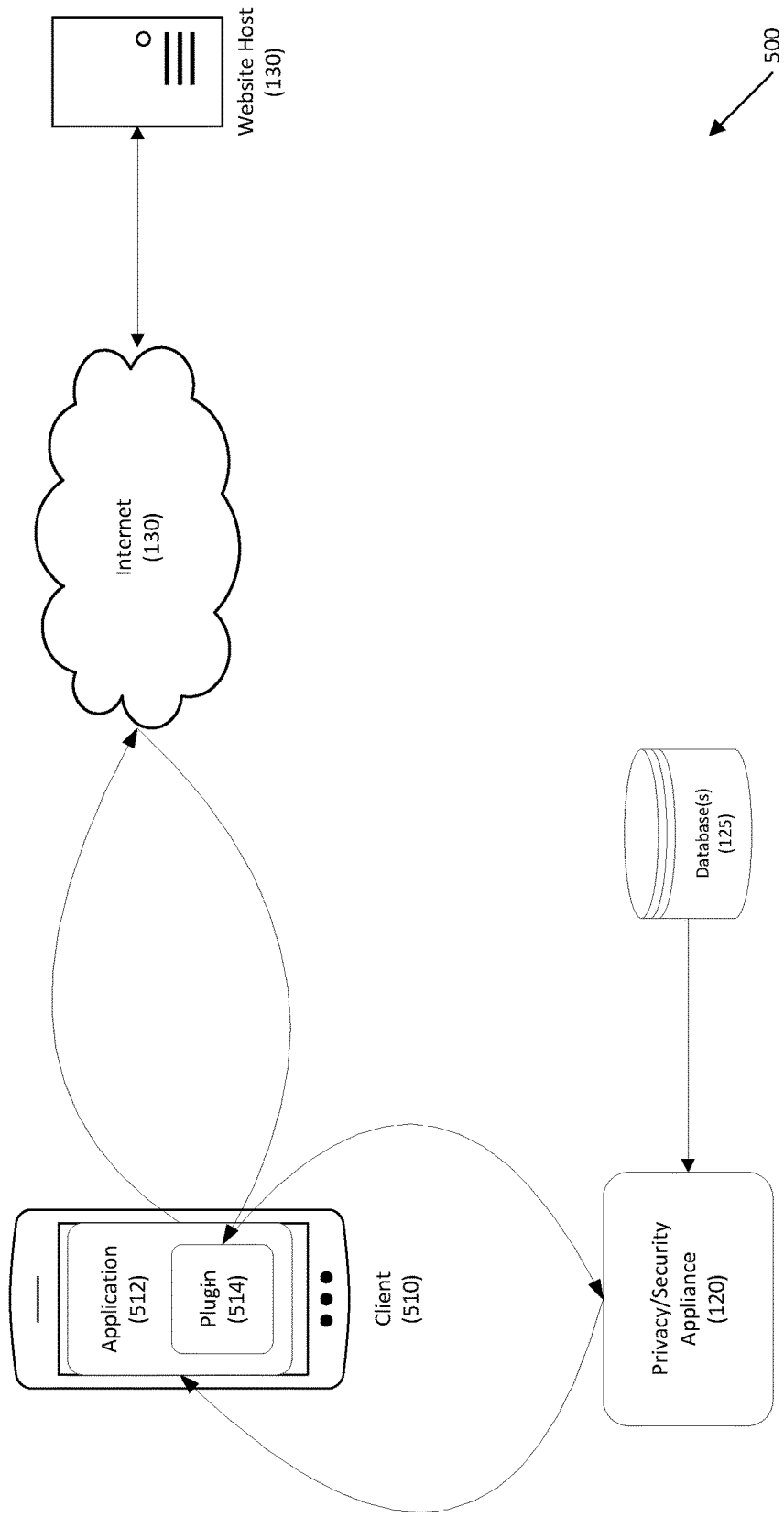
FIG. 5 depicts a system for providing pre-emptive intercept warning for online privacy or security according to another embodiment.

Referring to FIG. 5, a system for providing pre-emptive intercept warning for online privacy or security are disclosed according to another embodiment. System 500 may include client device 510, such as a mobile device, PC, Internet of Things (IoT) appliance, etc., a privacy/security appliance, etc. Client device 510 may execute application 512, which may be a web browser that may browse to websites. Application 512 may include plug-in 514, which may intercept responses from website host 140, and re-route them to privacy/security appliance 120.

Application 512 may be a browser, an application, etc. Plug-in 514 be a browser plug-in it, an extension, or an add-on.

Privacy/security appliance 120 may inspect the responses re-routed by plug-in 514, score the responses based on information available to it, and return the scorings to application 512. In one embodiment, the scorings may be provided with a mock webpage based on the results received from website host 140. In another embodiment, the scorings may be provided so that they may be viewed when the user selects a link or hovers over a link. In still another embodiment, privacy/security appliance 120 may modify the HTML of the response to embed the scorings in the webpage that is rendered by application 512.

Other techniques for presenting the scorings may be used as is necessary and/or desired.

In embodiments, because application 512 presents scorings as the user is viewing a webpage or a mock webpage, the user may be fully informed of any risks associated with browsing to a link immediately before the user selects a link, allowing the user to either proceed or not proceed with the selection.

Figure 6:
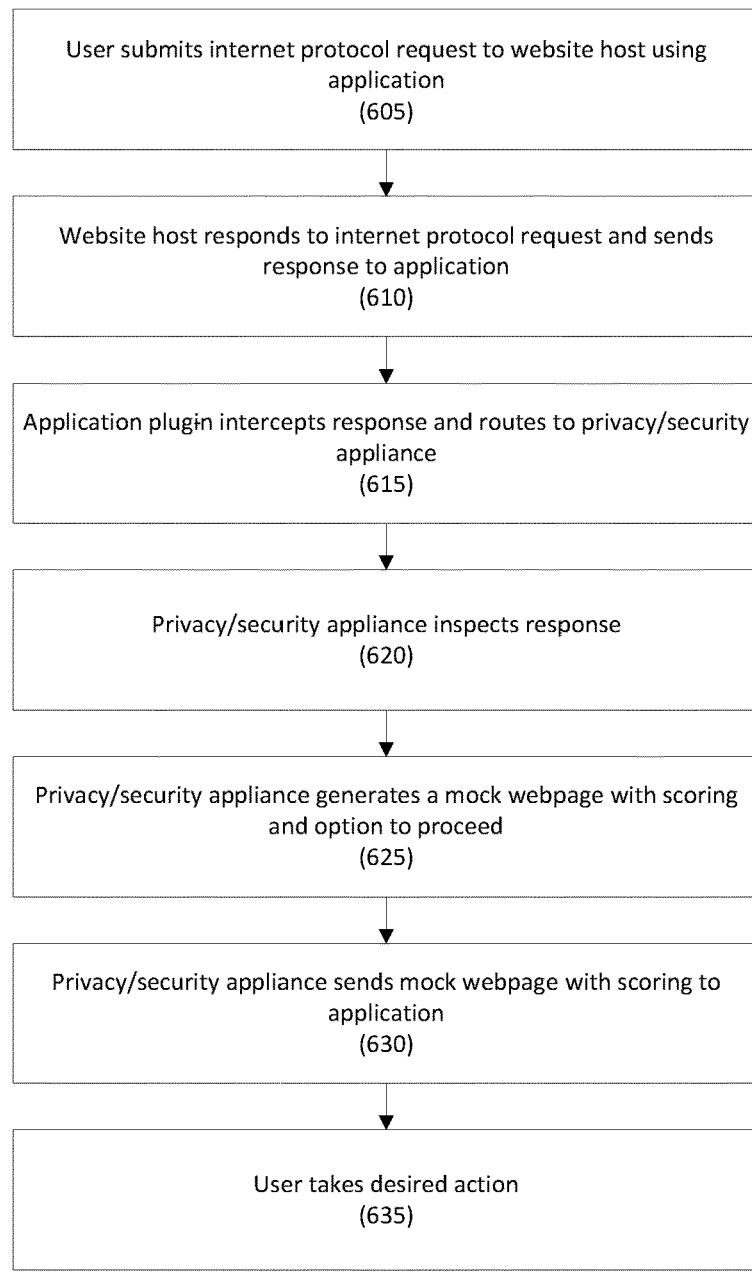
FIG. 6 depicts a method for providing pre-emptive intercept warning for online privacy or security according to one embodiment.

Referring to FIG. 6, a method for providing pre-emptive intercept warning for online privacy or security is disclosed according to an embodiment. In embodiments, the method may be used in conjunction with the system of FIG. 5

In step 605, an application, such as a browser, may submit an internet protocol request to a website host. For example, the internet protocol request may include a direct visit to the website host or a search request.

Examples of internet protocols include HTTP, HTTPS, HTTP/2, QUIC, etc.

In step 610, the website host may provide the response to the application.

In step 615, an application plug-in may intercept the website host's response and may re-route the response to a privacy/security appliance.

In step 620, the privacy/security appliance may inspect the response, including packets, that are returned from the website/host. This may be similar to step 225, above.

In step 625, the privacy/security appliance may render privacy/security warnings or scores to the user over a rendered mock webpage for the response(s) from the website(s)/host(s). This may be similar to step 230, above.

In step 630, the mock webpage with the warnings or scores may be delivered to the application and displayed by the application, and, in step 635, after reviewing the warnings, the user may take the desired action, such as selecting one or more link to the website and may be routed to the host, cancelling the browsing, etc.

Figure 7:
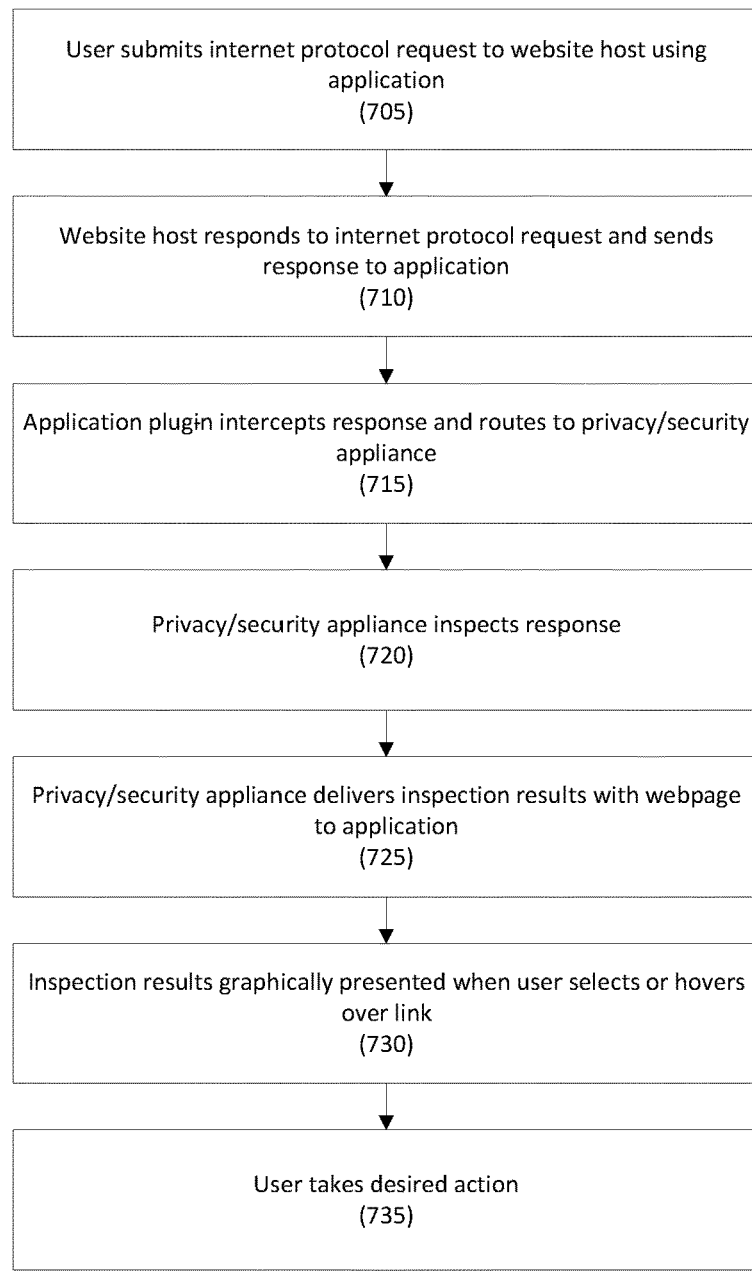
FIG. 7 depicts a method for providing pre-emptive intercept warning for online privacy or security according to another embodiment.

Referring to FIG. 7, a method for providing pre-emptive intercept warning for online privacy or security are disclosed according to another embodiment. In embodiments, the method may be used in conjunction with the system of FIG. 5.

In step 705, an application, such as a browser, may submit an internet protocol request to a website host. This may be similar to step 605, above.

In step 710, the website host may provide the response to the application. This may be similar to step 610, above.

In step 715, an application plug-in may intercept the website host's response and may re-route the response to a privacy/security appliance. This may be similar to step 615, above.

In step 720, the privacy/security appliance may inspect the response, including packets, that are returned from the website/host. This may be similar to step 325, above.

In step 725, the privacy/security appliance may generate privacy/security warnings or scores to the user that are displayed when the user selects or "hovers over" a link in the webpage and may deliver the inspection results with the webpage to the application. In one embodiment, the privacy/security appliance may embed hidden warnings or scores in the internet protocol response. This may be similar to step 330, above.

In step 730, the privacy/security warnings or scores may be presented to the user when the user selects a link, hovers over a link, moves a selector toward a link, etc. This may be similar to step 335, above In step 735, after reviewing the warnings or scores, the user may take the desired action, such as selecting one or more link to the website and may be routed to the host, cancelling the browsing, etc.

Figure 8:
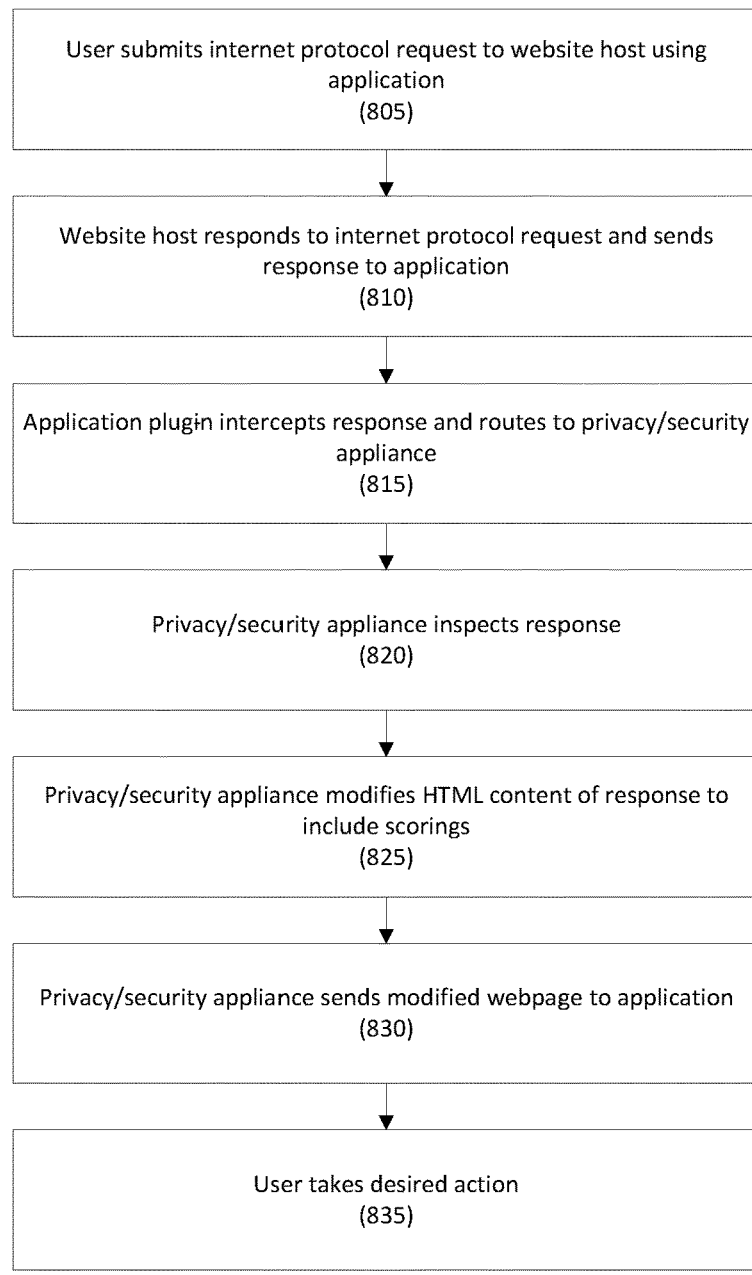
FIG. 8 depicts a method for providing pre-emptive intercept according to another embodiment.

Referring to FIG. 8, a method for providing pre-emptive intercept warning for online privacy or security are disclosed according to another embodiment. In embodiments, the method may be used in conjunction with the system of FIG. 5.

In step 805, an application, such as a browser, may submit an internet protocol request to a website host. This may be similar to step 605, above.

In step 810, the website host may provide the response to the application. This may be similar to step 610, above.

In step 815, an application plug-in may intercept the website host's response and may re-route the response to a privacy/security appliance. This may be similar to step 615, above.

In step 820, the privacy/security appliance may inspect the response, including packets, that are returned from the website/host. This may be similar to step 425, above.

In step 825, the privacy/security appliance may modify the HTML to include warnings or scores based on the analysis. This may be similar step 430, above.

In step 830, the privacy/security appliance may deliver the modified HTML content that includes the warnings or scores to the application, and the application may display the modified HTML content for the user.

In step 835, after reviewing the warnings or scores, the user may take the desired action, such as selecting one or more link to the website and may be routed to the host, cancelling the browsing, etc.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing pre-emptive intercept warning for online privacy or security, comprising:
   establishing, by a privacy security appliance, a virtual private network (VPN) connection with a computer application executed by a client device;
   receiving, by the privacy security appliance and from the computer application over the VPN connection, an Internet Protocol (IP) request for a website host;
   communicating, by the privacy security appliance, the IP request to the website host;
   receiving, by the privacy security appliance, a response to the IP request from the website host, the response including a webpage comprising a plurality of embedded links;
   inspecting, by the privacy security appliance, the response for privacy or security issues with the embedded links;
   scoring, by the privacy security appliance, each of the embedded links based on the inspection;
   generating, by the privacy security appliance, a mock webpage based on the response,
      wherein the mock webpage does not include integrated elements to be stored or executed by a browser of the client device and represents a visual appearance of the webpage,
      wherein the embedded links are replaced with links to the embedded links, and
      wherein code in the mock webpage includes the scoring for each of the embedded links for display on the client device; and
   delivering, by the privacy security appliance, the mock webpage to the computer application over the VPN.

2. The method of claim 1, wherein the privacy security appliance obfuscates identifying information for the computer application and the client device before communicating the IP request to the website host.

3. The method of claim 1, wherein the computer application comprises a web browser.

4. The method of claim 1, further comprising:
   retrieving, from a database, a privacy policy associated with one of the embedded links, wherein the embedded link is scored based on the privacy policy.

5. The method of claim 1, further comprising:
   determining that the embedded link is on a blacklist of websites, wherein the embedded link is scored based on its presence on the blacklist.

6. The method of claim 1, further comprising:
   determining that the embedded link is on a blacklist of websites, wherein the embedded link is scored based on its presence on the blacklist.

7. A method for providing pre-emptive intercept warning for online privacy or security, comprising:
   receiving, by a privacy security appliance and from a plug-in for a computer application executed by a client device, a response to an Internet Protocol (IP) request from a website host, wherein:
      the IP request is submitted by the computer application without use of the plug in, and
      the response is intercepted by the plug-in and is re-routed to the privacy security appliance, the response including a webpage comprising a plurality of embedded links;
   inspecting, by the privacy security appliance, the response for privacy or security issues with the embedded links in the response;
   scoring, by the privacy security appliance, the embedded links based on the inspection;

generating, by the privacy security appliance, a mock webpage based on the response,
   wherein the mock webpage does not include integrated elements to be stored or executed by a browser of the client device and represents a visual appearance of the webpage, and
   wherein the embedded links are replaced with links to the embedded links; and
delivering, by the privacy security appliance, the mock webpage with the scoring to the plug-in,
   wherein the plug-in provides the mock webpage to the computer application for display with the plug-in causing information associated with the scoring to be displayed over the mock webpage.

8. The method of claim 7, wherein the computer application comprises a web browser.

9. The method of claim 7, further comprising:
retrieving, from a database, a privacy policy associated with one of the embedded links, wherein the embedded link is scored based on the privacy policy.

10. The method of claim 7, further comprising:
determining that the embedded link is on a blacklist of websites, wherein the embedded link is scored based on its presence on the blacklist.

11. The method of claim 7, further comprising:
determining that the embedded link is on a blacklist of websites, wherein the embedded link is scored based on its presence on the blacklist.

12. A method for providing pre-emptive intercept warning for online privacy or security, comprising:
establishing, by a privacy security appliance, a virtual private network (VPN) connection with a computer application executed by a client device;
receiving, by the privacy security appliance and from the computer application over the VPN connection, an Internet Protocol (IP) request for a website host;
communicating, by the privacy security appliance, the IP request to the website host;
receiving, by the privacy security appliance, a response to the IP request from the website host, the response including a webpage comprising a plurality of embedded links;
inspecting, by the privacy security appliance, the response for privacy or security issues with the embedded links;
scoring, by the privacy security appliance, each of the embedded links based on the inspection;
generating, by the privacy security appliance, a mock webpage based on the response,
   wherein the mock webpage does not include integrated elements to be stored or executed by a browser of the client device and represents a visual appearance of the webpage, and
   wherein the embedded links are replaced with links to the embedded links; and
delivering, by the privacy security appliance, the mock webpage with the scoring of each of the embedded links to the computer application over the VPN,
   wherein the browser of the client device processes the mock webpage and the scoring of each of the embedded links to present the scoring over the mock webpage in association with corresponding links of the mock webpage.

13. The method of claim 12, wherein the embedded scoring is not presented until activated.

14. The method of claim 13, wherein the embedded scoring is activated by hovering over the embedded link or selecting the embedded link.

15. The method of claim 12, further comprising:
modifying HTML in the response to display the score for each embedded link.

16. The method of claim 12, wherein the privacy security appliance obfuscates identifying information for the computer application and the client device before communicating the IP request to the website host.

17. The method of claim 12, wherein the computer application comprises a web browser.

18. The method of claim 12, further comprising:
retrieving, from a database, a privacy policy associated with one of the embedded links, wherein the embedded link is scored based on the privacy policy.

19. The method of claim 12, further comprising:
determining that the embedded link is on a blacklist of websites, wherein the embedded link is scored based on its presence on the blacklist.

20. The method of claim 12, further comprising:
determining that the embedded link is on a blacklist of websites, wherein the embedded link is scored based on its presence on the blacklist.

\* \* \* \* \*